United States Patent Office 3,247,204
Patented Apr. 19, 1966

3,247,204
SULFUR-CONTAINING SPIRO BARBITURATES
AND PROCESS
William S. Friedlander, Hudson, Wis., and John R. Mattson, Maplewood, Minn., assignors to Minnesota Mining and Manufacturing Company, St. Paul, Minn., a corporation of Delaware
No Drawing. Filed Apr. 5, 1963, Ser. No. 270,812
11 Claims. (Cl. 260—257)

This application is a continuation-in-part of copending applications Serial Numbers 73,477 and 73,478 filed December 5, 1960, now abandoned.

This invention relates to certain new and useful spiro [(3′-organo-thiomethyl - cyclohexane-1′,5-(barbiturates)] and particularly to spiro[(3′ - organomercaptomethyl-cyclohexane-1′,5 - (barbiturates)], spiro[(3′ - organosulfonylmethyl-cyclohexane-1′,5(barbiturates)] and spiro [3′-organosulfinylmethyl-cyclohexane-1′,5-(barbiturates)] and methods for making the same.

The new spirobarbiturates are generically represented by the formula:

(1)

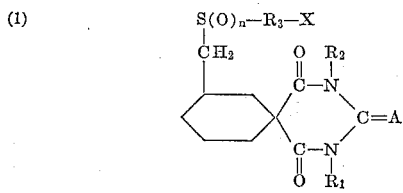

where $R_1$ and $R_2$ are individually selected from the group consisting of hydrogen, alkyl, and lower alkenyl, A is selected from the group consisting of oxygen and sulfur, X is selected from the group consisting of hydrogen, hydroxyl, lower alkoxy, carboxy, lower carbalkoxy, lower alkanoyloxy, cyano, halo, nitro, amino, lower monoalkylamino and lower dialkylamino, $R_3$ is an alkylene radical having from 1 through 18 carbon atoms, separating the active hydrogen-containing, halo and nitro groups of X from $S(O)_n$ by at least 2 carbon atoms, and $n$ is a digit from 0 to 2 inclusive.

Compounds of Formula 1 form useful physiologically acceptable salts when $R_1$ is hydrogen in which the organic group is the anion. A broad generic formula for these anionic salts can be written as follows:

(2)

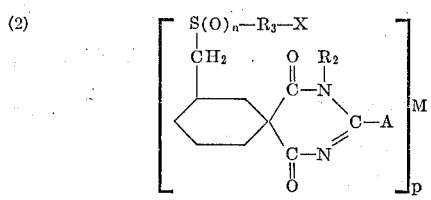

where M is selected from the group consisting of alkali metals, alkaline earth metals, ammonium and organic ammonium radicals; $R_2$, $R_3$, A, X and $n$ have their above given meanings; and $p$ is an integer from 1 to 2 which number is equal to the valence of M in any given compound.

By the term "organic ammonium radicals" reference is had to mono, di, tri, and tetra-organo substituted ammonium radicals, e.g., salts with amines and quaternary ammonium bases.

Preferred compounds of this invention are those of the formulas 1 and 2 wherein $R_1$ and $R_2$ are both hydrogen, A is oxygen, $R_3$ is an alkylene radical containing not more than 6 carbon atoms, and X is hydrogen, lower alkoxy, or lower mono or dialkylamino.

The compounds of Formula 1 are readily prepared by reacting the appropriate diallylbarbituric acid with the appropriate mercaptan. Oxidation to the sulfoxide or sulfone when $n$ is 1 or 2 and introduction of lower alkenyl groups are effected subsequently as described here-inelsewhere. The initial reaction is summarized by the following equation:

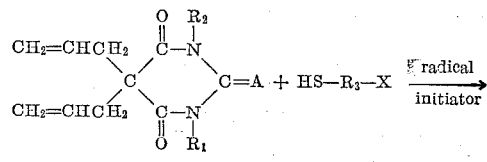

(3)      (4)

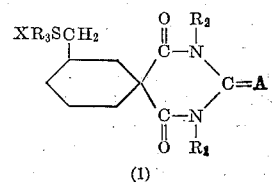

(1)

where $R_1$ and $R_2$ are hydrogen or lower alkyl and $R_3$, A, and X have their above defined significance.

Oxidation of the sulfide to the sulfoxide or sulfone is conveniently effected by hydrogen peroxide in glacial acetic acid. Reaction occurs at ambient temperatures slowly but is more rapid at elevated temperatures. After completion the product is recovered by quenching the reaction mixture in ice and water or simply by filtration.

The term "free-radical initiator" or just "radical initiator" as used in this application has conventional reference to agents capable of causing homolytic cleavage as by thermal activation of the compounds of Formula 4 above. Any suitable radical initiator known to the art can be used to initiate the reaction. As those skilled in the art will readily appreciate, radical initiators which are degraded or otherwise inactivated by compounds of Formula 4 obviously will not produce the desired reaction. Suitable radical initiators include, for example, such materials as benzoyl peroxide, azobisisobutyronitrile, ditertiary butyl peroxide, lauroyl peroxide, dicumyl peroxide, actinic radiation such as ultraviolet light, perbenzoic acid, cumylhydroperoxide and the like.

In general, the reaction is carried out in an inert liquid diluent or solvent. The word "solvent" as used in this application is equivalent to the word "diluent" and does not necessary indicate that there is a true solution. The use of a solvent in the processes of this invention is incidental and not critical but offers the advantage of controlling reactions in which there is considerable exotherm. Generally, a liquid which is inert over the range of reaction conditions involved is employed. For reasons of availability, inert liquid hydrocarbons are preferred, such as benzene, hexane, heptane, toluene, and the like.

We prefer to employ an amount of solvent at least sufficient to facilitate mixing of reactants. Thus, we prefer to use an amount of solvent at least equal in weight to the combined weight of the reactants employed in any given reaction. More preferably, we use an amount of solvent equal to ten times the combined weight of the reactants employed althrough the amount of solvent actually employed for a given reaction is not critical.

Concerning quantitiy of the respective reactants of Formulas 3 and 4 above employed in the processes of this invention one can employ an excess of either class of starting material. Thus, one can employ a 20:1 molar ratio, or even greater, of one reactant to the other. However, from the standpoint of efficiency, approximate molar ratios from 1:1 to 2:1 of the compounds of Formula 4 to those of Formula 3 (i.e., slightly in excess of stoichiometric proportions) are preferred. An excess of Formula 4 compounds may sometimes be used as a reaction medium.

The amount of chemical radical initiator employed for a given reaction can in general vary between wide limits. Usually one will employ at least about 0.001% to 1% of radical initiator based upon combined weight of reactants. Commonly, not more than about 3 percent of radical initiator will be employed based upon the combined weight of the reactants. The optimum amount of radical initiator to be employed in any given reaction will of course vary from reaction to reaction, and it is not possible to give the exact amount for every given combination of reaction conditions and reactants. However, as those of ordinary skill in the art will appreciate, one will use an amount of radical initiator which is sufficient to cause a reaction to proceed. When ultraviolet light is used as the radical initiator, one will employ an amount of illumination which will induce compounds of Formula 4 to react with those of Formula 3.

In general, the reaction is conducted at room temperatures (i.e., about 20° C.) up to the reflux temperature of the particular diluent or solvent employed. We generally prefer to employ temperatures at or near reflux, but, as those skilled in the art will appreciate, the optimum reaction temperature for any specific reaction is that which will produce the greatest extent of reaction between the compounds. Reaction times are generally under 24 hours.

The extent of the reaction can be determined by observing the amount of barbituric acid starting material remaining in a reaction mixture at time intervals after reaction has been initiated. One convenient way we use is to employ a solvent such as benzene in which diallylbarbituric acid starting material is substantially insoluble under the reaction conditions. Then we may visually observe the amount of unreacted barbituric acid starting material present in the reaction vessel. The products of the reaction are isolated from the reaction mixture by conventional distillation and recrystallization techniques.

The starting materials of Formulas 3 and 4, respectively, may be prepared by any conventional means known to the art. Diallylbarbituric acid itself is commercially available and can be used to prepare N-lower alkyl substituted derivatives by conventional alkylation procedures; see, for example, the procedures described in: Chemical Abstracts, 28, 2370 (1934), Chem. Abstract, 27, 5085 (1933), Chem. Abstract, 42, 573 (1948), Chem. Abstract, 44, 6525 (1950), Chem. Abstract, 46, 3154 (1952) also, N-alkyl or N,N′-dialkyl derivatives of 5,5-diallylbarbituric acid can be made from the corresponding urea derivatives and diallylmalonic ester. N-alkenyl derivatives are made from the cyclized (spiro) product of Formula 2. The presence of an alkenyl group on one or more of the nitrogen atoms of 5,5-diallylbarbituric acid starting material of Formula 3 tends to produce undesirable side ractions.

A preferred method of preparing compounds of Formula 1 wherein $R_1$ is lower alkenyl, i.e., unsaturated lower alkyl, and $R_2$ is selected from the group consisting of hydrogen and lower alkyl, and compounds of Formula 1 where $R_1$ and $R_2$ are both lower alkenyl consists of contacting the corresponding sodium salt of the appropriate Formula 1 compound with the lower alkenyl halide (where the halide is chloride, iodide or preferably bromide).

The salts of Formula 2 are readily prepared from the appropriate free acidic compounds of Formula 1 by conventional methods.

Products of this invention prepared by the routes described above are comprised of mixtures of optically active isomers, e.g., due to asymmetry about the common spiro carbon atom. The laevo-forms are belived to have the greater biological activity. Those skilled in the art will appreciate the broad melting ranges of the products of this invention are the result of the formation of the compound as two or more racemic mixtures. The salts formed with optically active bases for example, with alkaloids, may be used for the resolution of the racemic mixtures of the invention.

The compounds of this invention are physiologically active. Thus, compounds of Formulas 1 and 2, when $n$ is 1 or 2, $R_1$ is hydrogen, and $R_2$ is hydrogen or lower alkyl (other substituents remaining the same as defined), display hypnotic activity. When $R_1$ and $R_2$ in Formulas 1 and 2 are both alkyl (other substituents remaining the same as defined), the compounds are convulsants.

The salts of the barbituric acids of the invention, e.g., the compounds of Formula 2, have value as buffering agents, as where a specific pH must be maintained in an aqueous solution, for example, for in vitro physiological test purposes. They are effective in the range of about pH 7–10.

The compounds of Formulas 1 and 2 display plant growth regulant activity and have some fungicidal action.

The invention is further illustrated by reference to the following examples:

Example 1

Butylmercaptan, 2.97 g. (0.033 mole); 5,5-diallylbarbituric acid, 7.2 g. (0.3 mole) and 100 ml. of benzene was heated to reflux in a 250 ml. quartz flask over a Hanovia U.V. lamp. After 24 hours' refluxing an additional 2 ml. of mercaptan was added and refluxing was continued for 62 hours. The resulting solution was cooled to 25° and filtered. The filter cake was digested in benzene, then crystallized from ethanol. Spiro[3′-butylmercaptomethyl-cyclohexane-1′,5-(barbituric acid)] melting at 178–179° C. was obtained.

Calculated for $C_{14}H_{22}N_2O_3S$: 56.4% C, 7.38% H, 10.7% S. Found: 56.5% C, 7.6% H, 10.5% S.

To a stirred mixture of 4.9 g. of the above product in 50 ml. of glacial acetic acid was slowly added 9.15 g. of 30 percent aqueous hydrogen peroxide. After stirring at room temperature for one hour the reaction mixture was heated to reflux for four hours, cooled and filtered. The colorless product was digested in ethanol, filtered hot and washed with ether. Spiro[3′-butylsulfonylmethyl-cyclohexane-1′,5-(barbituric acid)] melting at about 189–190° C. was thus obtained.

Calculated for $C_{14}H_{22}N_2O_5S$: 50.9% C, 6.7% H, 8.49% N. Found: 50.9% C, 6.6% H, 8.5% N.

To a mixture of 8.94 g. of the above spiro[3′-butylmercaptomethyl-cyclohexane-1′,5-(barbituric acid)] in 100 g. of glacial acetic acid was slowly added 3.6 g. of 30 percent aqueous $H_2O_2$ while stirring at room temperature. The reaction mixture was then refluxed two hours then concentrated over steam at reduced pressure. Water was added to the residue and the white solid was filtered off. After digesting in EtOH and drying, 3 g. of colorless solid spiro[3′-butylsulfinylmethyl-cyclohexane-1′,5-(barbituric acid)] was obtained, M.P. 217–220° C.

Calculated for $C_{14}H_{22}N_2O_4S$: 53.6% C, 7.0% H, 8.92% N. Found: 53.6% C, 7.0% H, 8.99% N.

Salts of spiro[3′-butylsulfinylmethyl cyclohexane-1′,5-(barbituric acid)] are prepared by adding a solution of 0.1 mole of sodium hydroxide in 50 ml. of ethanol to a solution of 0.1 mole of the free acid in 100 ml. of absolute ethanol. The mixture is filtered and the filtrate is evaporated to dryness. The residue which consists of sodium spiro[3'-butylsulfinylmethyl cyclohexane-1',5-(barbituric acid)] is dried under vacuum at about 50° C. for several hours. The same procedure is followed using corresponding stoichiometric equivalents of potassium hydroxide, calcium hydroxide, magnesium hydroxide, and ammonium hydroxide to prepare respectively, the K, Ca, Mg and ammonium salts of spiro[3'-butylsulfinyl-methyl-cyclohexane-1',5-(barbituric acid)].

The corresponding salts of the above barbituric acids containing sulfide and sulfone groups are obtained by employing those acids in the above procedure.

Example 2

A mixture of diallyl barbituric acid, 41.6 g. (0.2 mole); ethyl mercaptan, 4 g. (0.22 mole); azobisisobutyronitrile, 0.5 g. and 400 ml. of benzene was heated to reflux in a one liter flask fitted with water in Dry Ice cooled condensers. The reaction mixture was refluxed 20 hours after which 10 ml. of additional ethyl mercaptan and 0.5 g. of additional azobisisobutyronitrile were added. Refluxing was then continued four more hours. The warm reaction mixture was filtered and the cake was washed with fresh benzene. The product spiro[3'-ethylmercaptomethyl-cyclohexane-1',5-(barbituric acid)] obtained by recrystallization from ethanol melted at 176–177° C.

Calculated for $C_{12}H_{18}N_2O_3S$: 53.3% C, 6.67% H, 10.3% N. Found: 53.3% C, 6.6% H, 10.8 %N.

To a stirred mixture of 50 ml. of glacial acetic acid and 10 g. of spiro[3'-ethylmercaptomethyl-cyclohexane-1',5-(barbituric acid)] was slowly added 9.15 g. of 30 percent aqueous $H_2O_2$. After stirring at room temperature for one hour the reaction mixture was heated to reflux for four hours, cooled and filtered. The colorless solid was digested in EtOH, filtered hot and washed with ether. The product spiro[3'-ethylsulfonylmethyl-cyclohexane-1',5-(barbituric acid)] melted at 225–7° C.

Calculated for $C_{12}H_{18}N_2O_5S$: 47.7% C, 5.97% H. Found: 47.4% C, 6.0% H.

Salts of spiro[3'-ethylsulfonylmethyl-cyclohexane-1',5-(barbituric acid)] are prepared by adding a solution of 0.1 mole of sodium hydroxide in 50 ml. of ethanol to a solution of 0.1 mole of the free acid in 100 ml. of absolute ethanol, as described in Example 1 above.

When an ethanol solution containing stoichiometric amounts of tetramethyl ammonium hydroxide and the same free acid is evaporated to dryness, there is obtained the tetramethyl ammonium salt of spiro[3'-ethylsulfonyl-methyl-cyclohexane-1',5-(barbituric acid)].

When a solution of about 0.01 mole of brucine in ethanol is mixed with a solution of 0.01 mole of the same free acid, the brucine salt is precipitated.

Salts of spiro[3'-ethylmercaptomethyl-cyclohexane-1',5-(barbituric acid)] are prepared by similar procedures.

Example 3

5,5-diallyl barbituric acid, 20.8 g. (0.1 mole), octyl mercaptan, 16 g. (0.11 mole); and 100 ml. of benzene were placed in a 500 ml. quartz flask and heated to reflux over a Hanovia U.V. lamp. After refluxing 16 hours the reaction mixture was cooled to 25° C. and filtered. The filter cake was recrystallized from ethanol giving 20 g. of spiro[3'-octylmercaptomethyl-cyclohexane-1',5-(barbituric acid)] melting at 182–183° C.

Calculated for $C_{18}N_{30}N_2O_3S$: 61.1% C, 8.47% H. Found: 61.7% C, 8.4% H.

Eleven grams of the above spiro[3'-octylmercapto-methyl-cyclohexane-1',5-(barbituric acid)] was treated with 30 percent aqueous $H_2O_2$ according to the procedure described in Example 1. Spiro[3'-octylsulfonylmethyl-cyclohexane-1',5-(barbituric acid)] was obtained as colorless crystals melting at 176–8° C.

Calculated for $C_{18}H_{30}N_2O_5S$: 56.0% C, 7.5% H, 7.25% N. Found: 56.0% C, 7.5% H, 7.26% N.

Example 4

A mixture of 5,5-diallylbarbituric acid, 20.8 g.; monothioglycol, 8.5 g.; and 100 ml. of benzene is heated to reflux in a quartz flask exposed to a Hanovia U.V. lamp. After refluxing 48 hours an insoluble oil is obtained which is separated from the benzene layer. The oil is taken up in acetone then heated over steam to boil off acetone and excess glycol. The crude product is crystallized from aqueous EtOH. Spiro[3'-β-hydroxyethylmercapto-methyl-cyclohexane-1',5-(barbituric acid)] thus prepared melts at 108.5–109.5° C.

Calculated for $C_{12}H_{18}N_2O_4S$: 50.3% C, 6.3% H, 11.2% S. Found: 50.2% C, 6.5% H, 10.7% S.

Example 5

Ethyl mercaptoacetate, 26.4 g.; 5,5-diallylbarbituric acid, 41.6 g.; azobisisobutyronitrile, 0.25 g. and 400 ml. of benzene are refluxed in a 1-l. flask for 72 hours, cooled to room temperature and filtered. The benzene is removed at reduced pressure and the residue is crystallized from EtOH giving spiro[3'-carbethoxy methyl mercapto-methyl-cyclohexane-1',5-(barbituric acid)] melting at 130–5° C.

Calculated for $C_{14}H_{20}N_2O_5S$: 51.2% C, 6.1% H. Found: 54.4% C, 5.9% H.

Example 6

A mixture of pentylmercaptan, 30.0 g.; 5,5-diallyl-barbituric acid, 41.6 g. and 250 ml. benzene are refluxed in a quartz flask exposed to a Hanovia U.V. lamp for 16 hours. The solvent is then removed at reduced pressure. The residue is crystallized from ethanol, to give spiro[3'-pentylmercaptomethyl-cyclohexane - 1',5 - (barbituric acid)].

Example 7

N-alkenyl-substituted derivatives of the compounds of Formula 1 where $R_1$ and/or $R_2$ are lower alkenyl groups are prepared by treating the corresponding sodium salt, prepared as described above, in the presence of a diluent such as benzene with a stoichiometric amount of the desired lower alkenyl bromide and then heating the mixture on a steam bath until the calculated amount of sodium bromide is obtained. The reaction mixture is filtered and the diluent removed at reduced pressure. The product is crystallized from benzene or other appropriate solvent. Thus the compound spiro[3'-butylmercapto-methyl-cyclohexane-1',5-(1-allylbarbituric acid)] is prepared from the sodium salt of spiro[3'-butylmercapto-methyl-cyclohexane-1',5-(barbituric acid)] of Example 1. The yields of N-alkenyl-substituted thiobarbituric acids (compounds of Formula 1 in which A is S) may be rather low as a result of side reactions which may occur in the above procedure.

The following examples, presented in tabular form as Table I, show the preparation of additional compounds of Formula 1.

A ten mole percent excess of compounds of Formula 4 to compounds of Formula 3 is employed for the formation of the sulfides ($n=0$). The solvent is benzene. Azobisisobutyronitrile is employed as the radical initiator in Examples 8, 9, 19, 20 and 21 in an amount of about 1% based on the combined weight of the reactants. In Examples 10 through 18, 22 and 23 ultraviolet light is the initiator as described above. Reaction time is about 24 hours and the temperature is maintained at or near reflux, in each instance. The symbols refer to the substituents in the compounds of each formula. Oxidation to the sulfoxides and sulfones is effected employing stoichiometric quantities of $H_2O_2$ in the procedure described above in Example 1 above.

TABLE 1

| Example Number | Substituents of Formula 3 Compounds | | | Substituents of Formula 4 Compounds | | | Sulfide | H₂O₂ Moles | Sulfoxide or Sulfone |
|---|---|---|---|---|---|---|---|---|---|
| | A | $R_1$ | $R_2$ | $R_3$ | X | | | | |
| 8 | O | H | H | $C_2H_4$ | CN | | $NCC_2H_4SCH_2$–⟨cyclohexane⟩–(CONH–C=O–CONH) | 1 | $NCC_2H_4SOCH_2$–⟨cyclohexane⟩–(CONH–C=O–CONH) |
| 9 | O | H | $CH_3$ | $CH_2$ | $CH_3$ | | $CH_3CH_2SCH_2$–⟨cyclohexane⟩–(CONH–C=O–CONCH_3) | 2 | $CH_3CH_2SO_2CH_2$–⟨cyclohexane⟩–(CONH–C=O–CONCH_3) |
| 10 | O | $CH_3$ | $CH_3$ | $C_2H_4$ | OH | | $HOC_2H_4SCH_2$–⟨cyclohexane⟩–(CONCH_3–C=O–CONCH_3) | 2 | $NOC_2H_4SO_2CH_2$–⟨cyclohexane⟩–(CONCH_3–C=O–CONCH_3) |
| 11 | O | $C_2H_5$ ᵃ | H | $C_3H_6$ | H | | $C_4H_9SCH_2$–⟨cyclohexane⟩–(CON–C_3H_5–C=O–CONH) | 1 | $n$-$C_4H_9SOCH_2$–⟨cyclohexane⟩–(CON–C_3H_5–C=O–CONH) |
| 12 | O | N | $CH_3$ | $C_2H_4$ | Cl | | $ClC_2H_4SCH_2$–⟨cyclohexane⟩–(CONCH_3–C=O–CONH) | 1 | $ClC_2H_4SOCH_2$–⟨cyclohexane⟩–(CONCH_3–C=O–CONH) |
| 13 | O | $CH_3$ | $CH_3$ | $CH_2$ | $CO_2H$ | | $HOCOCH_2SCH_2$–⟨cyclohexane⟩–(CON–CH_3–C=O–CON–CH_3) | 2 | $HOCOCH_2SO_2CH_2$–⟨cyclohexane⟩–(CON–CH_3–C=O–CON–CH_3) |
| 14 | S | H | H | $C_2H_4$ | $NH_2$ | | $H_2NC_2H_4SCH_2$–⟨cyclohexane⟩–(CONH–C=S–CONH) | 1 | $H_2NC_2H_4SOCH_2$–⟨cyclohexane⟩–(CONH–C=S–CONH) |
| 15 | S | $CH_3$ | H | $C_{18}H_{36}$ | H | | $C_{18}H_{37}SCH_2$–⟨cyclohexane⟩–(CONCH_3–C=S–CONH) | 2 | $C_{18}H_{37}SO_2CH_2$–⟨cyclohexane⟩–(CONCH_3–C=S–CONH) |
| 16 | S | H | H | $C_2H_4$ | $C_2H_4NH$ | | $C_2H_5NHC_2H_4SCH_2$–⟨cyclohexane⟩–(CONH–C=S–CONH) | 1 | $C_2H_5NHC_2H_4SOCH_2$–⟨cyclohexane⟩–(CONH–C=S–CONH) |

See footnote at end of table.

TABLE 1.—Continued

| Example Number | Substituents of Formula 3 Compounds | | | Substituents of Formula 4 Compounds | | | Sulfide | H₂O₂ Moles | Sulfoxide or Sulfone |
|---|---|---|---|---|---|---|---|---|---|
| | A | R₁ | R₂ | R₃ | X | | | | |
| 17 | O | C₆H₁₃ | C₆H₁₃ | C₂H₄ | (C₂H₅)₂N | | (C₂H₅)₂NC₂H₄SCH₂–[cyclohexane]–(CON–C₆H₁₃)(C=O)(CON–C₆H₁₃) | 2 | (C₂H₅)₂NC₂H₄SO₂CH₂–[cyclohexane]–(CON–C₆H₁₃)(C=O)(CON–C₆H₁₃) |
| 18 | S | H | H | C₂H₄ | CH₃COO | | CH₃COOC₂H₄SCH₂–[cyclohexane]–(CONH)(C=O)(CONH) | 2 | CH₃COOC₂H₄SO₂CH₂–[cyclohexane]–(CONH)(C=O)(CONH) |
| 19 | O | C₃H₅ ᵃ | C₃H₅ ᵃ | C₅H₁₀ | H | | C₈H₁₇SCH₂–[cyclohexane]–(CON–C₃H₅)(C=O)(CON–C₃H₅) | 1 | C₈H₁₇SOCH₂–[cyclohexane]–(CON–C₃H₅)(C=O)(CON–C₃H₅) |
| 20 | S | C₆H₁₃ | H | C₄H₁₂ | H | | C₄H₉SCH₂–[cyclohexane]–(CON–C₆H₁₃)(C=S)(CONH) | 2 | C₄H₉SO₂CH₂–[cyclohexane]–(CON–C₆H₁₃)(C=S)(CONH) |
| 21 | O | H | H | C₂H₄ | C₂H₅O | | C₂H₅OC₂H₄SCH₂–[cyclohexane]–(CONH)(C=O)(CONH) | 2 | C₂H₅OC₂H₄SO₂CH₂–[cyclohexane]–(CONH)(C=O)(CONH) |
| 22 | O | H | H | C₂H₄ | NO₂ | | O₂NC₂H₄SCH₂–[cyclohexane]–(CONH)(C=O)(CONH) | 1 | O₂NC₂H₄SOCH₂–[cyclohexane]–(CONH)(C=O)(CONH) |
| 23 | O | H | CH₃ | C₅H₁₀ | CO₂H | | HO₂CC₅H₁₀SCH₂–[cyclohexane]–(CONCH₃)(C=O)(CONH) | 2 | HO₂CC₅H₁₀SO₂CH₂–[cyclohexane]–(CONCH₃)(C=O)(CONH) |

ᵃ Allyl groups introduced as described in Example 7.

What is claimed is:
1. A compound of the group consisting of:
I. a compound of the formula:

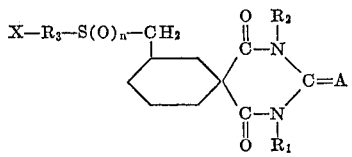

Wherein $R_1$ and $R_2$ are individually selected from the group consisting of hydrogen, alkyl and lower alkenyl, A is selected from the group consisting of oxygen and sulfur, X is selected from the group consisting of hydrogen, hydroxyl, lower alkoxy, carboxy, lower carbalkoxy, lower alkanoyloxy, cyano, halo, nitro, amino, lower monoalkylamino, and lower dialkylamino, $R_3$ is an alkylene radical having from 1 through 18 carbon atoms separating active hydrogen-containing, halo and nitro groups of X from $S(O)_n$ by at least 2 carbon atoms and $n$ is a digit from 0 to 2 inclusive and II. a physiologically acceptable salt thereof with base 2. In a process for preparing a compound of the formula:

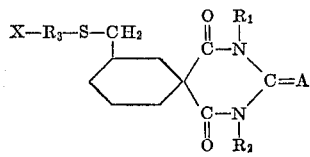

wherein $R_1$ and $R_2$ are selected from the group consisting of hydrogen and lower alkyl, A is selected from the group consisting of oxygen and sulfur, X is selected from the group consisting of hydrogen, hydroxyl, lower alkoxy, carboxy, lower carbalkoxy, lower alkanoyloxy, cyano, halo, nitro, amino, lower monoalkylamino and lower dialkylamino, and $R_3$ is an alkylene radical containing from 1 through 18 carbon atoms separating active hydrogen-containing, halo and nitro gorups of X from S by at least two carbon atoms, the step of reacting, in the presence of a radical initiator in an inert hydrocarbon diluent, a compound of the formula:

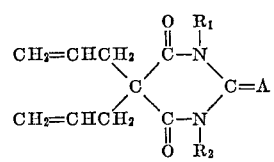

wherein A, $R_1$ and $R_2$ have the above significance with a compound of the formula:

wherein X and $R_3$ have the above significance.

3. Spiro[3'-ethylsulfonylmethyl-cyclohexane-1',5-(barbituric acid)].
4. Spiro[3'-butylmercaptomethyl-cyclohexane-1',5-(barbituric acid)].
5. Spiro[3'-butylsulfinylmethyl-cyclohexane-1',5-(barbituric acid)].
6. Spiro[3'-butylsulfonylmethyl-cyclohexane-1',5-(barbituric acid)].
7. Spiro[3'-ethylmercaptomethyl-cyclohexane-1',5-(barbituric acid)].
8. Spiro[3'-octylmercaptomethyl-cyclohexane-1',5-(barbituric acid)].
9. Spiro[3'-octylsulfonylmethyl-cyclohexane-1',5-(barbituric acid)].
10. Spiro[3' - β - hydroxyethylmercaptomethyl-cyclohexane-1',5-(barbituric acid)].
11. Spiro[3'-carbethoxymethylmercaptomethyl-cyclohexane-1',5-(barbituric acid)].

No references cited.

NICHOLAS S. RIZZO, *Primary Examiner.*

JAMES W. ADAMS, *Assistant Examiner.*